United States Patent
Cole

(10) Patent No.: US 6,535,550 B1
(45) Date of Patent: Mar. 18, 2003

(54) TRANSCEIVER WITH VARIABLE WIDTH CYCLIC PREFIX

(75) Inventor: Terry L. Cole, Austin, TX (US)

(73) Assignee: Legerity, Inc., Austin, TX (US)

( * ) Notice: Subject to any disclaimer, the term of this patent is extended or adjusted under 35 U.S.C. 154(b) by 0 days.

(21) Appl. No.: 09/257,674

(22) Filed: Mar. 2, 1999

(51) Int. Cl.[7] .............................................. H04L 5/16
(52) U.S. Cl. ..................................................... 375/222
(58) Field of Search ................................ 375/219, 260, 375/231, 222; 370/210, 207, 419; 709/227

(56) References Cited

U.S. PATENT DOCUMENTS

| | | | |
|---|---|---|---|
| 5,928,327 A | 7/1999 | Wang et al. ................ | 709/217 |
| 5,995,483 A * | 11/1999 | Marchok et al. ............ | 370/207 |
| 5,999,220 A | 12/1999 | Washino ..................... | 348/441 |
| 6,018,816 A | 1/2000 | Tateyama ................... | 714/746 |
| 6,081,502 A * | 6/2000 | Paneth et al. ............... | 370/210 |
| 6,144,695 A * | 11/2000 | Helms et al. ............... | 370/201 |
| 6,185,251 B1 * | 2/2001 | Fertner ....................... | 375/229 |
| 6,307,889 B1 * | 10/2001 | Chun .......................... | 375/260 |

OTHER PUBLICATIONS

Committee T1—Telecommunications, Working Group T1E1.4 TIE1.4/98–007R5, Plano, TX; Nov. 30–Dec. 4, 1998. Draft Standard, "T1.413 Issue 2," Project: Standards Project for Interfaces Relating to Carrier to Customer Connection of Asymmetrical Digital Subscriber Line (ADSL) Equipment.

International Telecommunication Union; Telecommunication Standardization Sector; G.992.1 Editor Final Version, Editor Recommendation G.992.1 (ex G.dmt), "Draft New Recommendation G.992.1—Asymmetrical Digital Subscriber Line (ADSL) Transceivers—Approved," Study Period 1997–2000, Jul. 1999.

International Telecommunication Union; Telecommunication Standardization Sector; COM 15–134R1–E, Study Group 15—Contribution 134; Editor Recommendation G.994.1, "Draft New Recommendation G.994.1—Handshake Procedures for digital Subscriber Line (DSL) Transceivers—For Approval," Study Period 1997–2000, Mar. 1999.

International Telecommunication Union; Telecommunication Standardization Sector; COM 15–136–E, Study Group 15—Contribution 136; Editor Recommendation G.992.2, "Draft New Recommendation G.992.2—Splitterless Asymmetric Digital Subscriber Line (ADSL) Transceivers—For Approval," Study Period 1997–2000, Mar. 1999.

* cited by examiner

Primary Examiner—Stephen Chin
Assistant Examiner—Kevim Kim
(74) Attorney, Agent, or Firm—Williams, Morgan & Amerson, P.C.

(57) ABSTRACT

A transceiver includes a receive unit and a transmit unit. The receive unit is adapted to receive a prefix width parameter. The transmit unit includes a modulator and a cyclic prefix unit. The modulator is adapted to receive digital data and generate an output symbol based on the digital data. The output symbol includes a plurality of waveform samples. The cyclic prefix unit is adapted to receive the output symbol and the prefix width parameter. The cyclic prefix unit generate a cyclic prefix based on a subset of the plurality of waveform samples and prepends the cyclic prefix to the output symbol to generate a transmit symbol. The size of the subset is based on the prefix width parameter. A method for adjusting the symbol rate of a transceiver includes receiving a prefix width parameter and receiving digital data. An output symbol is generated based on the digital data. The output symbol includes a plurality of waveform samples. A cyclic prefix is generated based on a subset of the plurality of waveform samples. The cyclic prefix is prepended to the output symbol to generate a transmit symbol. The size of the subset is based on the prefix width parameter.

15 Claims, 3 Drawing Sheets

TRANSCEIVER WITH VARIABLE WIDTH CYCLIC PREFIX

BACKGROUND OF THE INVENTION

1. Field of the Invention

This invention relates generally to communication systems, and, more particularly, to a transceiver with a variable width cyclic prefix.

2. Description of the Related Art

In communications systems, particularly telephony, it is common practice to transmit signals between a subscriber station and a central switching office via a two-wire bi-directional communication channel. The Plain Old Telephone System (POTS), designed primarily for voice communication, provides an inadequate data transmission rate for many modem applications. To meet the demand for high-speed communications, designers have sought innovative and cost-effective solutions that take advantage of the existing network infrastructure. Several technological advancements have been proposed in the telecommunications industry that make use of the existing network of telephone wires. One of these technologies is the xDSL technology. DSL technology uses the existing network of telephone lines for broadband communications. An ordinary twisted pair equipped with DSL interfaces can transmit videos, television, and high-speed data.

DSL technologies leave the POTS service undisturbed. Traditional analog voice band interfaces use the same frequency band, 0–4 Kilohertz (kHz), as telephone service, thereby preventing concurrent voice and data use. A DSL interface, on the other hand, operates at frequencies above the voice channels from 100 KHz to 1.1 Megahertz (MHz). Thus, a single DSL line is capable of offering simultaneous channels for voice and data.

DSL systems use digital signal processing (DSP) to increase throughput and signal quality through common copper telephone wire. Certain DSL systems provide a downstream data transfer rate from the DSL Point-of-Presence (POP) to the subscriber location at speeds of about 1.5 Megabits per second (MBPS). The transfer rate of 1.5 MBPS, for instance, is fifty times faster than a conventional 28.8 kilobits per second (KBPS) transfer rate.

One popular version of the DSL technology is the Asymmetrical Digital Subscriber Line (ADSL) technology. The ADSL standard is described in ANSI T1.413 Issue 2, entitled, "Interface Between Networks and Customer Installation—Asymmetric Digital Subscriber Line (ADSL) Metallic Interface, Rev. R4, dated Jun. 12, 1998, incorporated herein by reference in its entirety.

ADSL modems use two competing modulation schemes: discrete multi-tone (DMT) and carrierless amplitude/phase modulation (CAP). DMT is the standard adopted by the American National Standards Institute. The technology employed by DMT ADSL modems is termed discrete multi-tone. The standard defines 256 discrete tones. Each tone represents a carrier signal that can be modulated with a digital signal for transmitting data. The specific frequency for a given tone is 4.3125 KHz times the tone number. Tones 1–7 are reserved for voice band and guard band (i.e., tone 1 is the voice band and tones 2–7 are guard bands). Data is not transmitted near the voice band to allow for simultaneous voice and data transmission on a single line. The guard band helps isolate the voice band from the ADSL data bands. Typically, a splitter may be used to isolate any voice band signal from the data tones. Tones 8–32 are used to transmit data upstream (i.e., from the user), and tones 33–256 are used to transmit data downstream (i.e., to the user). Alternatively, all the data tones 8–256 may be used for downstream data, and upstream data present on tones 8–32 would be detected using echo cancellation. Because more tones are used for downstream communication than for upstream communication, the transfer is said to be asymmetric.

Through a training procedure, the modems on both sides of the connection sense and analyze which tones are less affected by impairments in the telephone line. Each tone that is accepted is used to carry information. Accordingly, the maximum capacity is set by the quality of the telephone connection. The maximum data rate defined by the ADSL specification, assuming all tones are used, is about 8 MBPS downstream and about 640 KBPS upstream.

In a typical ADSL system, a central office (CO) modem communicates with a customer premise (CP) modem. The CP modem is typically installed in a home or office. It is likely that the CO modems will remain in service for a number of years, while CP modems will have a relatively short upgrade cycle. The comparatively long service life of the CO modems makes them less flexible and responsive to enhancements in the CP modem. In other words, performance gains in the CP modem may not have as great of an effect on the overall transfer rate if the CO modem is of an older vintage and not able to respond to the increased finctionality.

The present invention is directed to overcoming, or at least reducing the effects of, one or more of the problems set forth above.

SUMMARY OF THE INVENTION

One aspect of the present invention is seen in a transceiver including a receive unit and a transmit unit. The receive unit is adapted to receive a prefix width parameter. The transmit unit includes a modulator and a cyclic prefix unit. The modulator is adapted to receive digital data and generate an output symbol based on the digital data. The output symbol includes a plurality of waveform samples. The cyclic prefix unit is adapted to receive the output symbol and the prefix width parameter. The cyclic prefix unit generate a cyclic prefix based on a subset of the plurality of waveform samples and prepends the cyclic prefix to the output symbol to generate a transmit symbol. The size of the subset is based on the prefix width parameter.

In another aspect of the present invention, a method is provided for adjusting the symbol rate of a transceiver. The method includes receiving a prefix width parameter and receiving digital data. An output symbol is generated based on the digital data. The output symbol includes a plurality of waveform samples. A cyclic prefix is generated based on a subset of the plurality of waveform samples. The cyclic prefix is prepended to the output symbol to generate a transmit symbol. The size of the subset is based on the prefix width parameter.

BRIEF DESCRIPTION OF THE DRAWINGS

The invention may be understood by reference to the following description taken in conjunction with the accompanying drawings, in which like reference numerals identify like elements, and in which.

Figure 1:
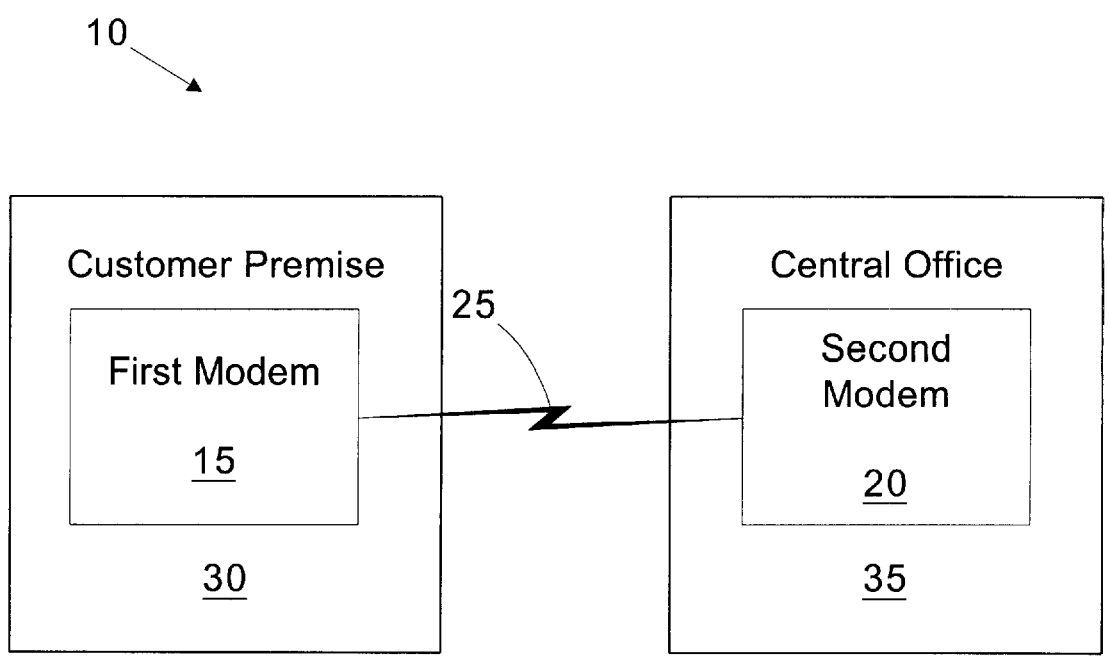
FIG. 1 is a block diagram of a communications system in accordance with the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Referring to FIG. 1, a block diagram of a communications system 10 is provided. The communications system 10 includes a first modem 15 coupled to a second modem 20 through a connection 25. In the illustrated embodiment, the first modem 15 is located at a customer premise 30, and the second modem 20 is part of a central office 35. The connection 25 is an ordinary twisted pair connection, as is common in present-day telephone networks. However, other connection types (e.g. wireless, cellular, etc.) are contemplated, depending on the specific implementation. Also, it is contemplated that the second modem 20 may not be part of the central office 35, but rather the second modem 20 may be installed in a second customer premise (not shown). For purposes of illustration, the modems 15, 20 are described as they might be implemented under the ADSL protocol (ANSI T1.413 Issue 2, entitled, "Interface Between Networks and Customer Installation—Asymmetric Digital Subscriber Line (ADSL) Metallic Interface, Rev. R4, dated Jun. 12, 1998). It is contemplated that the techniques described herein may be applied to other communication protocols, depending on the specific implementation.

In the illustrated embodiment, the second modem 20 acts as a gateway to a larger communications network (not shown), such as a local or wide area network, or the Internet. Typically, the first modem 15 establishes a connection to the communications network (not shown) through the second modem 20. During the process of establishing the connection, the first and second modems 15 and 20 complete a training process whereby an initial bit loading technique (e.g., water filling, equal energy distribution, etc.) is employed to establish the throughput available for communication between the modems 15, 20.

Although the present invention is described as it may be implemented in a modem, it is contemplated that, in light of this disclosure, the invention may be applied to any type of transceiver, including, but not limited to, a modem or some other wired or wireless communication device.

Figure 2:
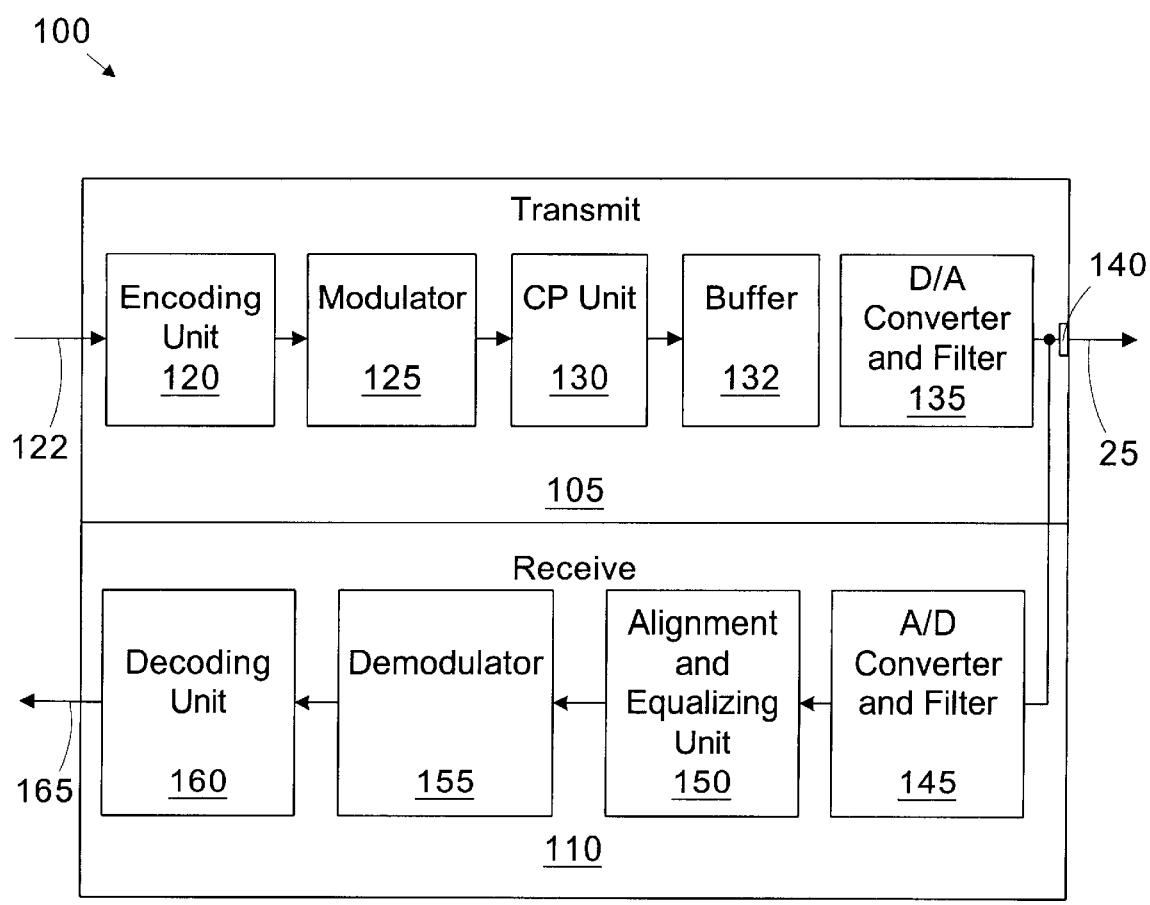
FIG. 2 is a simplified block diagram of a modem in accordance with the present invention.

Referring to FIG. 2, a simplified block diagram of a modem 100 is provided. The modem 100 may be the first modem 15 or the second modem 20. For clarity and ease of illustration, not all functional blocks are illustrated in detail, because these items are known to those of ordinary skill in the art, and are further defined in well known modem standards.

The modem 100 includes transmit and receive functional blocks 105, 110. The transmit block 105 includes an encoding unit 120 adapted to receive outgoing digital data over a data-out line 122. The encoding unit 120 performs functions such as cyclic redundancy checking (CRC), scrambling, forward error correction, and interleaving. As stated above, these functions are known to those of ordinary skill in the art.

The data in binary form is grouped into sets referred to as frames. A plurality of frames (i.e., 68 in the illustrated embodiment) is referred to as a superframe. The transmit block 105 also includes a modulator 125 that receives the data frames from the encoding unit 120 and modulates a carrier or carriers with the data. The modulator 125 performs tone ordering, constellation encoding, gain scaling, and an inverse discrete Fourier transform (IDFT) function to provide time domain waveform samples. The set of time domain waveform samples corresponding to a frame of data is referred to as a symbol. A cyclic prefix (CP) unit 130 performs cyclic prefix insertion (i.e., a subset of the output samples from the modulator 125 is replicated and prepended to the existing output samples to provide an overlap and allow for better symbol alignment). A buffer 132 stores the samples received from the CP unit 130. A digital to analog (D/A) converter and filter 135 converts the samples from the CP unit 130 to an analog waveform suitable for transmission over the connection 25 through an external line interface 140.

The receive block 110 includes an analog to digital (A/D) converter and filter 145 that receives an analog waveform over the connection 25 and samples the analog waveform to generate a time domain digital signal. An alignment and equalizing unit 150 performs functions known in the art, such as symbol alignment and time domain equalization. In time domain equalization, because the tones are at different frequencies, certain frequencies travel faster than others, and as such, all the tones do not arrive at same time. The time domain equalization function of the alignment and equalizing unit 150 delays the faster tones to compensate for the propagation speed differences. There is a performance trade off between the symbol alignment and time domain equalization functions in that a higher degree of symbol alignment accuracy allows a lesser degree of accuracy in time domain equalization. Cyclic prefix insertion improves symbol alignment accuracy. The alignment and equalizing unit 150 also performs gain control to increase the amplitude of the received signal.

A demodulator 155 receives the time domain samples from the alignment and equalizing unit 150 and converts the time domain data to frequency domain data. The demodulator 155 performs a slicing function to determine constellation points from the constellation encoded data, a demapping function to map the identified constellation point back to bits, and a decoding function (e.g., Viterbi decoding if trellis constellation coding is employed). In the case where the modem operates using the ADSL protocol, the demodulator 155 also performs tone deordering to reassemble the bytes that were divided among the available tones. A decoding unit 160 in the receive block 110 performs forward error correction, CRC checking, and descrambling functions on the data received from the demodulator 155. The reconstructed data provided by the decoding unit 160 represents the sequential binary data that was sent by the interfacing modem (not shown). The reconstructed data is provided to a data-in line 165.

Figure 3:
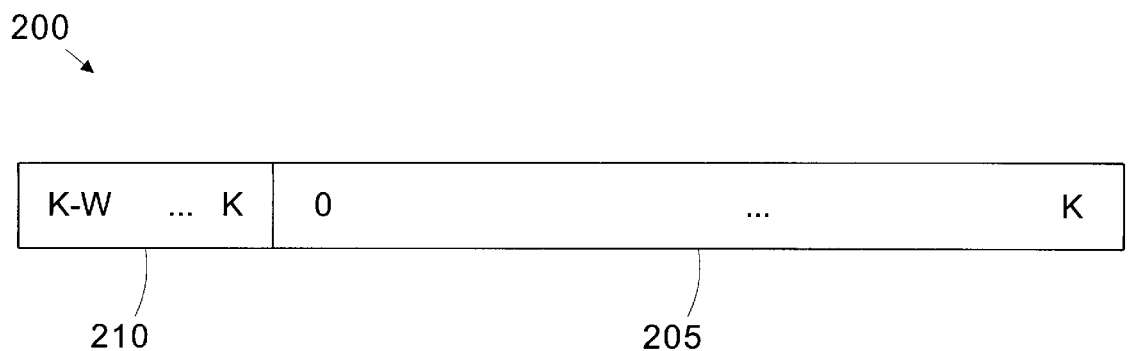
FIG. 3 is a diagram illustrating the partitioning of a data symbol transmitted by the modem of FIG. 2.

The operation of the CP unit 130 is described in greater detail with reference to FIG. 3. FIG. 3 illustrates the partitioning of a data symbol 200 generated by the modem 100. The data symbol 200 comprises a set of time domain waveform samples 205 corresponding to a frame of data being transmitted by the transmit block 105. In the illustrated embodiment, the IDFT performed by the modulator 125 generates 512 samples (i.e., K=511). The CP unit 130 generates a cyclic prefix 210 based on a subset of the set of time domain waveform samples 205. The cyclic prefix 210 is prepended to the time domain waveform samples 205 to reduce the likelihood of intersymbol interference when the symbol 200 is eventually received by an interfacing modem (not shown).

In general, the required width of the cyclic prefix 210 depends on the effectiveness of the time domain equalization performed by the receiver of an interfacing modem (not shown). In other words, as the proficiency of the time domain equalization performed by the interfacing modem (not shown) increases, the required width of the cyclic prefix 210 decreases, and may even reach zero (i.e., no cyclic prefix 210 required).

As defined by the ADSL standard, downstream data symbols (i.e., data sent from the central office 35 to the customer premise 30) are generated with a fixed width, 32-bit cyclic prefix 210 (i.e., W=31). Upstream data symbols (i.e., data sent from the customer premise 30 to the central office 35) are generated with a fixed width, 4-bit cyclic prefix 210 (i.e., W=3).

The CP unit 130 in accordance with the present invention is adapted to provide a variable width cyclic prefix 210. It is contemplated that either or both of the first and second modems 15, 20 may be adapted to specify variable cyclic prefix 210 widths.

During the training period, the modem 100 determines relevant attributes of the connecting channel and establishes transmission and processing characteristics suitable for that channel. During the exchange process, the receive unit 105 shares with its corresponding far-end transmit unit (not shown) certain transmission settings that it expects to encounter. For example, the receive unit 105 communicates to its far-end transmit unit the number of bits and relative power levels to be used on each DMT tone. The receive unit 105 also communicates a configuration message signal including vendor identification information, transmit power level, trellis coding option, echo canceling option, etc.

During this exchange, the receive unit 105 also transmits the desired width of the cyclic prefix 210. As defined by the ADSL standard, the configuration information is transferred using a configuration message signal (C-MSGS1 from the second modem 20 at the central office 35 and R-MSGS-1 from the first modem 15 at the customer premise 30). The standard requires that the configuration message signal be sent using symbols with a cyclic prefix 210. For this initial training message, the default cyclic prefix 210 widths may be used (i.e., 32-bits downstream and 4-bits upstream). After receiving the desired width of the cyclic prefix 210, subsequent symbols may be sent using the variable width of the cyclic prefix 210.

Using a distinct message field for specifying the width of the cyclic prefix 210 requires the addition of a field to the C/R-MSGS-1 signals. It is contemplated that this field addition may be avoided by specifying the desired width of the cyclic prefix 210 based on other information contained in the message, such as, for example, the T1.413 revision number or the vendor revision number.

Figure 4:
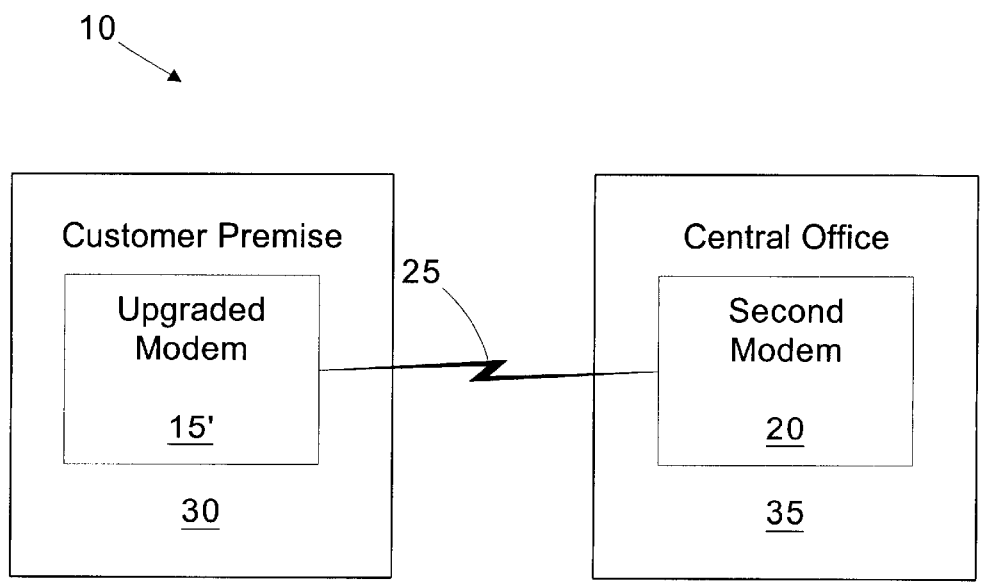
FIG. 4 is a block diagram of an alternative embodiment of a communications system in accordance with the present invention.

Allowing the width of the cyclic prefix 210 to be varied provides numerous advantages. For illustrative purposes, assume the first modem 15 at the customer premise 30 (shown in FIG. 1) is upgraded (as shown in FIG. 4). The upgraded modem 15' is capable of performing more accurate time domain equalization than the previously installed first modem 15. The upgraded modem 15' communicates a shorter cyclic prefix 210 width to the second modem 20 at the central office 35 in the configuration message signal. Because the CP unit 130 of the second modem 20 can support a variable width cyclic prefix 210, it can take advantage of the enhanced capabilities of the upgraded modem 15' and increase its symbol rate. If the cyclic prefix 210 is eliminated (i.e., zero width), the symbol rate may be increased by about 6.25%.

It is also contemplated that the width of the cyclic prefix 210 may be increased to a width greater than the standard 32-bits. Although increasing the width of the cyclic prefix 210 decreases the symbol rate, it also allows the second modem 20 to interface with a less powerful and perhaps less costly modem (not shown).

The flexibility provided by the variable width cyclic prefix 210 increases the service life of the second modem 20, because the second modem 20 may interface with other modems (not shown) having differing levels of performance without requiring an upgrade to the second modem 20.

Although the present invention is described in reference to the ADSL protocol, which defines a symbol width of 512 samples and a standard cyclic prefix width of 32 samples, it is contemplated that other protocols may define different symbol and cyclic prefix widths. For example, the symbol width may be 256 samples with a 16 bit cyclic prefix 210. The CP unit 130 may be adapted to provide a variable width cyclic prefix 210 within the context of any such other predefined symbol width and cyclic prefix width defined by another protocol.

Although specifying the width of the cyclic prefix 210 is described as a training exchange, it is contemplated that the width of the cyclic prefix 210 may be varied during the course of normal communication between the modems 15, 20. The ADSL standard describes methods for implementing dynamic rate adaptation using administrative overhead channel (aoc) messages. It is contemplated that an additional aoc message specific to the cyclic prefix 210 may be added. As with other aoc messages, the change in the width of the cyclic prefix 210 may be coordinated with the superframe counter such that both modems 15, 20 know when the change in the width of the cyclic prefix 210 is to be implemented. It is also contemplated that the negotiation of the cyclic prefix 210 width may be accomplished by an exchange before the actual training period, depending on the specific protocol used.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A transceiver, comprising:
    a receive unit adapted to receive a prefix width parameter from a remote transceiver external to the transceiver; and
    a transmit unit, comprising;
        a modulator adapted to receive digital data and generate an output symbol based on the digital data, the output symbol comprising a plurality of waveform samples; and
        a cyclic prefix unit adapted to receive the output symbol and the prefix width parameter, generate a cyclic prefix based on a subset of the plurality of waveform samples, and prepend the cyclic prefix to the output symbol to generate a transmit symbol, wherein the subset has a variable size based on the prefix width parameter.

2. The transceiver of claim 1, wherein the transmit unit further comprises:
    a digital to analog converter adapted to receive the transmit symbol and generate a time domain waveform signal based on the transmit symbol.

3. The transceiver of claim 1, wherein the output symbol comprises about 512 waveform samples, and the prefix width parameter comprises less than about 32.

4. The transceiver of claim 1, wherein the prefix width parameter comprises zero.

5. The transceiver of claim 1, wherein the output symbol has a width, and the ratio between the output symbol width and the prefix width parameter comprises less than about 16.

6. A communication system, comprising:
    a first transceiver, comprising:
        a first receiver adapted to receive data symbols and time domain equalize the data symbols at a first accuracy level; and
        a first transmitter adapted to transmit a prefix width parameter based on the first accuracy level; and
    a second transceiver, coupled to the first transceiver, the second transceiver comprising:
        a second receiver adapted to receive the prefix width parameter; and
        a second transmitter adapted to transmit the data symbols, the data symbol including a cyclic prefix, the cyclic prefix having a variable width based on the prefix width parameter.

7. The communications system of claim 6, wherein the data symbol comprises an output symbol and the cyclic prefix, the output symbol has a width of about 512 waveform samples, and the prefix width parameter comprises less than about 32.

8. The communications system of claim 6, wherein the prefix width parameter comprises zero.

9. The communications system of claim 6, wherein the data symbol comprises an output symbol having a width and the cyclic prefix, and the ratio between the output symbol width and the prefix width parameter comprises less than about 16.

10. A method for adjusting the symbol rate of a transceiver, comprising:
    receiving a prefix width parameter from a remote transceiver external to the transceiver;
    receiving digital data;
    generating an output symbol based on the digital data, the output symbol comprising a plurality of waveform samples;
    generating a cyclic prefix based on a subset of the plurality of waveform samples; and
    prepending the cyclic prefix to the output symbol to generate a transmit symbol, wherein the subset has a variable size based on the prefix width parameter.

11. The method of claim 10, further comprising converting the transmit symbol to a time domain waveform signal.

12. The method of claim 10, wherein generating the output symbol comprises generating an output symbol based on the digital data, the output symbol comprising about 512 waveform samples, and wherein the prefix width parameter comprising less than about 32.

13. The method of claim 10, wherein the prefix width parameter comprises zero.

14. The method of claim 10, wherein generating the output symbol comprises generating an output symbol having a width based on the digital data, and the ratio of the width of the output symbol to the prefix width parameter comprising less than about 16.

15. A transceiver, comprising:
    means for receiving a prefix width parameter from a remote transceiver external to the transceiver;
    means for receiving digital data;
    means for generating an output symbol based on the digital data, the output symbol comprising a plurality of waveform samples;
    means for generating a cyclic prefix based on a subset of the plurality of waveform samples; and
    means for prepending the cyclic prefix to the output symbol to generate a transmit symbol, wherein the subset has a variable size based on the prefix width parameter.

* * * * *